(12) United States Patent
Sternberg et al.

(10) Patent No.: US 6,258,414 B1
(45) Date of Patent: Jul. 10, 2001

(54) PROCESS FOR SILICONIZING INDUSTRIAL WOVEN FABRICS

(75) Inventors: Britta Sternberg, Sprockhovel; Frank Leymann, Willich; Werner Bernlohr, Erlenbach; Volker Siejak, Duisburg; Hans Albert Graefe, Schwelm; Hans Ulrich Eichert, Velbert, all of (DE)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/458,956

(22) Filed: Dec. 10, 1999

(30) Foreign Application Priority Data

Dec. 11, 1998 (DE) .............................. 198 57 269

(51) Int. Cl.$^7$ ........................................ B05D 1/18
(52) U.S. Cl. ................... 427/430.1; 427/387; 427/434.2
(58) Field of Search .............. 427/430.1, 434.2, 427/387

(56) References Cited

U.S. PATENT DOCUMENTS

| | | |
|---|---|---|
| 3,868,342 | 2/1975 | Magne . |
| 5,208,097 * | 5/1993 | Honma et al. ............... 428/266 |
| 5,236,775 * | 8/1993 | Swoboda et al. ............ 428/225 |
| 5,399,402 * | 3/1995 | Inoue et al. ............... 428/35.7 |
| 5,518,775 * | 5/1996 | Kosal et al. ............... 427/387 |
| 5,700,870 * | 12/1997 | Mueller et al. ............. 524/837 |
| 5,783,311 * | 7/1998 | Lorenzetti et al. .......... 428/447 |

FOREIGN PATENT DOCUMENTS

| | | |
|---|---|---|
| 21 769 * | 4/1958 | (DE) . |
| 21 66 262 * | 7/1993 | (DE) . |
| 0 758 666 A1 * | 2/1997 | (EP) . |
| 2 751 980 A1 * | 2/1998 | (FR) . |
| WO 98/05723 * | 2/1998 | (WO) . |

* cited by examiner

Primary Examiner—Shrive Beck
Assistant Examiner—Michael Barr
(74) Attorney, Agent, or Firm—Oliff & Berridge, PLC

(57) ABSTRACT

Industrial woven fabrics made from synthetic fibers are coated with silicone, in particular for use in airbags, by coating the fabric with an aqueous emulsion containing organosiloxanes. The fabrics obtained from the weaving process are coated in the raw state with the aqueous emulsion containing organosiloxanes.

9 Claims, 1 Drawing Sheet

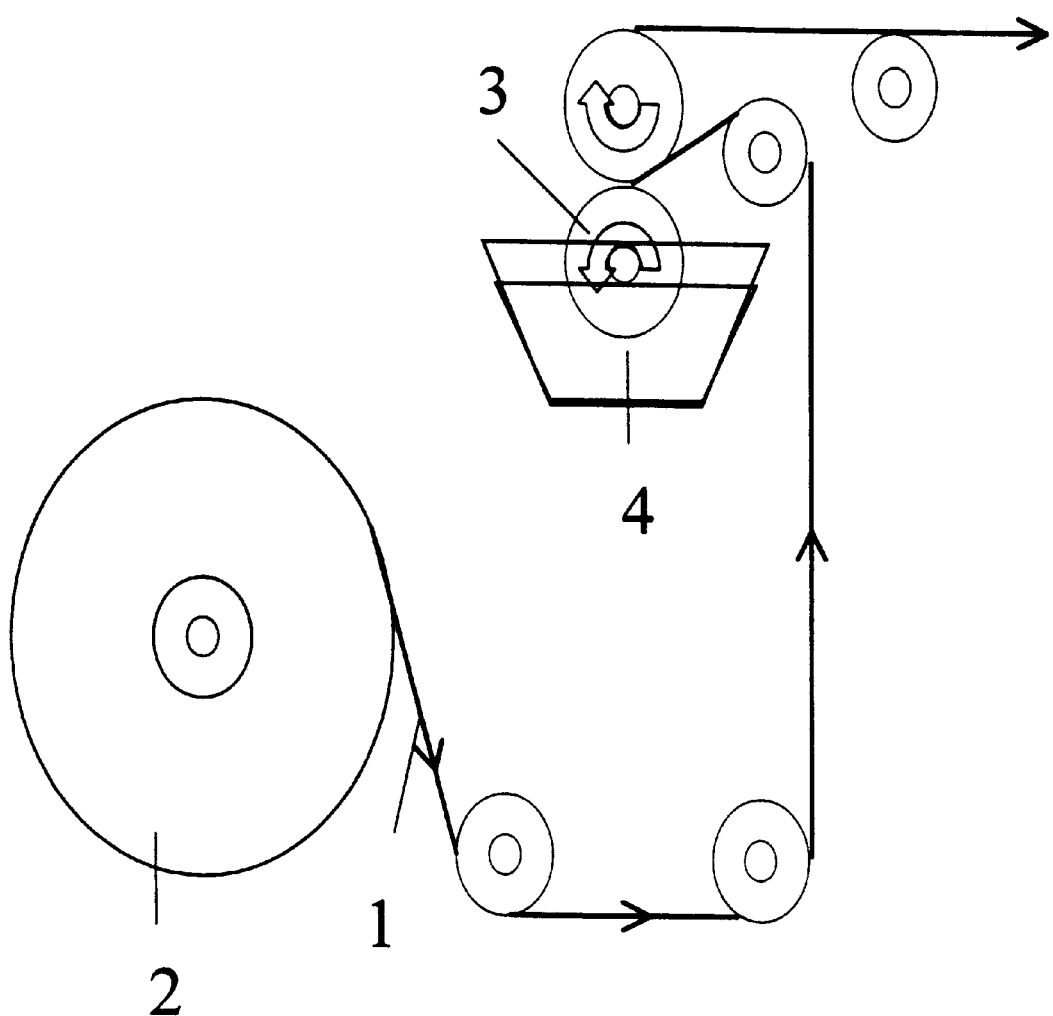

PROCESS FOR SILICONIZING INDUSTRIAL WOVEN FABRICS

FIELD OF THE INVENTION

The invention relates to a process for manufacturing woven fabrics made from synthetic fibers and coated with silicone, in particular for use in airbags, by coating the fabric with an aqueous emulsion containing organosiloxanes.

BACKGROUND

The coating of woven fabrics with silicone, also termed siliconization, for use in airbags is known to offer the advantage that the hot combustion gases and particles of the propellant charge cannot penetrate the fabric as rapidly, due to the ability of the silicone to absorb heat when the airbag is triggered. Such coatings thereby contribute to protecting the vehicle occupants from possible burns.

Furthermore, a silicone coating reduces the yarn-to-yarn friction produced by vibrations to which the airbag fabric, often enclosed for years in a tight space, is subjected and which can lead to a reduction in the tear resistance.

Finally, the air permeability of the airbag fabric can also be reduced via the silicone coating.

It is evident that the adhesion between the silicone layer and the airbag fabric must be such that, even after years of storage, no peeling of the silicone layer away from the fabric takes place, which would at least severely impair the function of the layer when the airbag is triggered.

Such a coating process is described in EP-A-0,758,666, for example. This publication discloses aqueous, organosiloxane-containing emulsions that are applied to an undried textile.

In accordance with EP-A-0,758,666, the application of the coating material takes place during or directly after the washing process. Particularly suited are synthetic fabrics that must be washed and dried. Care is required that the composition required for coating is applied directly to the still-wet fabric immediately after the washing step and is vulcanized during the drying step.

The coating process according to EP-A-0,758,666 offers the advantage over such processes in the prior art that, when using the organosiloxane-containing emulsions described in this patent, the fabrics can be coated without a preceding drying step, i.e., an additional coating step is no longer necessary after drying and nevertheless the adhesion of the silicone layer to the fabric is improved. Particularly in the case of fabrics made from synthetic fibers, a washing step is regarded as essential.

OBJECTS AND SUMMARY OF THE INVENTION

An object of the invention is to provide an additional coating process that offers increased economy and with which the adhesion between the fabric and the silicone layer is better than, or at least as good as, the processes known in the prior art.

The invention addresses this and other objects by providing a process for manufacturing woven fabrics made from synthetic fibers and coated with silicone, in particular for use in airbags, by coating the fabric with an aqueous emulsion containing organosiloxanes. In the process, the fabrics obtained from the weaving process are coated in the raw state with the aqueous emulsion containing organosiloxanes.

"Raw" in the context of the present invention refers to any woven fabric as obtained from the power loom and not yet washed. In this respect, the fabrics can be coated with the aqueous emulsion containing organosiloxanes without a previous washing step. The time between weaving and coating is generally not critical. Only after a very long storage time can it be advantageous for the fabric to be slightly moistened with water before the coating step.

It has been shown that, in using the process according to the invention, the adhesion between the fabric and the silicone layer is stronger than, or at least comparable to, the adhesion resulting when using the washing step described in the prior art. The washing of the fabric serves to free the fabric of adhered materials such as finishing and brightening agents, which derive from the weaving and intermediate processes and impair subsequent processing activity. These adhered materials are generally regarded as detrimental to the adhesion between the fabric and the coating, and it is therefore an objective of the prior art to remove them by performing a washing step. Surprisingly, it has been shown that, when conducting the process according to the invention, the washing step can be eliminated without having to accept the disadvantages related to adhesion.

BRIEF DESCRIPTION OF THE DRAWING

The invention is illustrated by means of the following non-limiting example.

The FIGURE shows schematically an apparatus for a siliconization process according to the invention.

DETAILED DESCRIPTION OF EMBODIMENTS

The coating is preferably conducted by immersing the raw fabrics from the weaving step in the aqueous emulsion containing organosiloxanes.

It is also possible to apply the aqueous emulsion containing organosiloxanes to the raw fabric by means of the slop-padding technique.

Although conventional aqueous, organosiloxane-containing emulsions are suitable for coating, the emulsions described in EP-A-0,758,666 are especially preferred for the process according to the invention.

It is advantageous for the coating of the raw fabric to be conducted such that the amount of coating is at most 20%, preferably at most 15%, of the total weight of the fabric.

There are no particular restrictions on the selection of industrial fabrics to be used, such as open or closed designs. Preferred woven designs are those that are more open than when using uncoated fabrics.

The manner of fabric manufacture is also not critical. Fabrics can be used that have been produced on all conventional power looms, such as water-jet, air-jet, or rapier looms. Air-jet and rapier looms are preferred for the present invention.

It has proven favorable for the fabrics selected for siliconization to be made at least predominantly from synthetic filament yarns with a total titer of 110 to 580 dtex, with 110 to 470 dtex being more preferred and 110 to 350 dtex being especially preferred. Filament yarns with a total titer of 110, 235, and 350 dtex have proven extremely satisfactory.

For the process according to the invention, it is advantageous to select fabrics for siliconization that are made at least predominantly (i.e., more than 50% by weight) from synthetic fibers with an individual-filament titer between 2.2 and 4.5 dtex.

Aqueous, organosiloxane-containing emulsions used for the process according to the invention can also contain other additives having a favorable effect on the properties of the coated industrial fabric. Worthy of particular mention are carbon-black additives that act as flame retardants in the fabric. The presence of such flame retardants is also especially advantageous when using the uncoated industrial fabrics in airbags.

It is therefore of advantage for about 1–10%, more preferably about 2–6%, by volume of carbon black, with respect to the total volume of the emulsion, to be mixed together with the aqueous emulsion before coating of the fabric is carried out.

With reference to the Figure, the fabric 1 is unwound from a dewinder 2 and then passed via guide rollers to a kiss roller 3 by which it is wetted with the aqueous emulsion 4 containing organosiloxanes. The fabric is then cured in a heat channel (not shown) and finally wound up.

Two fabrics obtained from polyamide 6.6 yarns with a total titer of 470 dtex each were siliconized using the equipment as described in the Figure The first fabric, referred to as sample 1, was washed after the weaving step and before the siliconization step. The second fabric, sample 2, was siliconized in the raw state without having undergone a washing step after weaving. Dehesive 38197 VP served as the organosiloxane in the aqueous emulsion.

After drying, the adhesion between the fabric and the silicone layer was tested according to DIN 53530. Furthermore, a scrub test was performed according to ISO 5981.

The following results were obtained:

|  | Adhesion (N/5 cm) | Scrub |
|---|---|---|
| Sample 1 (washed) | 150 | 1000 |
| Sample 2 (raw state) | 150 | 1000 |

Thus corresponding properties were unexpectedly achieved without the need for the washing step applied to Sample 1.

What is claimed is:

1. Process for manufacturing an industrial woven fabric made from synthetic fibers, comprising coating said fabric with silicone by coating the fabric as obtained from the weaving process in the raw state with an aqueous emulsion containing organosiloxanes, wherein the coating is performed prior to any washing of the fabric.

2. Process according to claim 1, wherein the fabric obtained from the weaving process is immersed in the aqueous emulsion containing organosiloxanes.

3. Process according to claim 1, wherein the fabric is coated with silicone in an amount of coating constituting at most 15% of the total weight of the fabric.

4. Process according to claim 1, wherein the fabric is made at least predominantly from synthetic filament yarns with a total titer of 110 to 580 dtex.

5. Process according to claim 1, wherein the fabric is made at least predominantly from synthetic filament yarns with a total titer of 110 to 470 dtex.

6. Process according to claim 1, wherein the fabric is made at least predominantly from synthetic filament yarns with an individual-filament titer between 2.2 and 4.5 dtex.

7. Process according to claim 1, wherein 1–10% by volume of carbon black, with respect to the total volume of the emulsion, is mixed with the aqueous emulsion before the coating of the fabric is carried out.

8. Process according to claim 1, wherein 2–6% by volume of carbon black, with respect to the total volume of the emulsion, is mixed with the aqueous emulsion before the coating of the fabric is carried out.

9. Process according to claim 1, further comprising forming the fabric as an airbag.

* * * * *

UNITED STATES PATENT AND TRADEMARK OFFICE
CERTIFICATE OF CORRECTION

PATENT NO. : 6,258,414 B1
DATED : July 10, 2001
INVENTOR(S) : Britta Sternberg; Frank Leymann; Werner Bernlohr; Volker Siejak; Hans Albert Graefe; and Hans Ulrich Eichert It is certified that error appears in the above-identified patent and that said Letters Patent is hereby corrected as shown below:

Column 2,
Line 56, change "yams" to -- yarns --; and
Line 58, change "yams" to -- yarns --

Column 3,
Line 19, after "Figure" insert -- . --.

Signed and Sealed this

Fourth Day of December, 2001

Attest:

NICHOLAS P. GODICI
Attesting Officer
Acting Director of the United States Patent and Trademark Office